Figure 1:
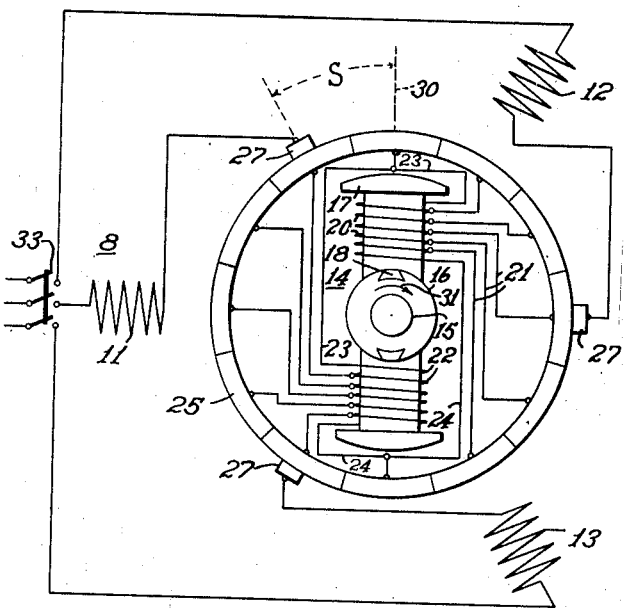

Nov. 2, 1943.                R. C. ROBINSON                 2,333,582
                    SELF-EXCITED SYNCHRONOUS MACHINE
                       Original Filed Sept. 5, 1939

WITNESSES:                                          INVENTOR
Edward Michaels                                  Robert C. Robinson.
                                                    BY
                                                       ATTORNEY Patented Nov. 2, 1943

2,333,582

UNITED STATES PATENT OFFICE 2,333,582

SELF-EXCITED SYNCHRONOUS MACHINE

Robert C. Robinson, Wilkinsburg, Pa., assignor to Westinghouse Electric & Manufacturing Company, East Pittsburgh, Pa., a corporation of Pennsylvania Substituted for application Serial No. 293,368, September 5, 1939. This application December 9, 1941, Serial No. 422,198

15 Claims. (Cl. 172—274)

This application is a substitute for my application, Serial No. 293,368, filed September 5, 1939.

My invention relates to self-excited synchronous machines, and it has particular relation to improvements in synchronous motors, whereby lower manufacturing-costs are obtained, together with improved operating-characteristics and performance.

At present, the most important object of my invention is believed to be the provision of a polyphase synchronous motor, with the exciting winding placed on laminated salient-poles, and with a commutator, instead of slip rings, and with a plurality of leads brought out from intermediate points in each of the field-windings, on the respective salient poles, and brought out to successive commutator-segments, and with three brushes (or polyphase brushes) bearing on the commutator and supplied with three-phase (or polyphase) current in series-circuit relation to the three-phase armature-winding of the motor. The result of such a construction is a substantially non-pulsating unidirectional flux in the field-core, with alternately north and south poles, at synchronous speed; and since the flux does not change, as the successive commutator-segments move under the brushes, the mutual inductance of the concentric coils or part-winding sections of the field-winding removes one of the greatest commutation-difficulties, namely the voltage due to changing flux-interlinkages in the coils undergoing commutation.

It will thus be seen that I achieve a reduction in the cost of the motor, because I have no damper winding, no exciter, and no control-apparatus such as direct-current relays, panelboards or resistances, which is more than offset against a slightly increased cost of the field-winding due to the intermediate taps, and the slightly greater cost of the commutator as compared to slip-rings. At the same time, I reduce the space-requirements, because of the omission of the exciter and the resistors, control-apparatus, and control-panel. I also obtain better efficiency, because of the elimination of the power which was previously required by the direct-current exciter.

At the same time, my improved motor is self-starting, operating, during the starting-period, in a manner somewhat similar or analogous to a polyphase commutator motor, with the important distinction that my motor has its commutated rotor-winding in the form of concentric coils for each pole, so that flux can be produced only in a predetermined magnetizing axis, as distinguished from the distributed windings, and rotating fluxes, which are produced in the rotor of an ordinary polyphase commutator motor. It is the concentric-coil construction which "fixes" the flux-axis in the field-member or rotor of my motor, and which causes my motor to have a very pronounced synchronizing torque, causing it to fall into synchronism, and operate at synchronism, without speeding up to over-synchronous speeds as in the ordinary polyphase commutator motor.

It will thus be seen that the functional operation of my improved synchronous motor involves many important advantages. The operation is simplicity itself: The simple closing of a line-switch or breaker causes the motor to start, and to run up to synchronous speed, and to fall into step without any further attention, the motor requiring no synchronizing, and no "angle-switching." My motor has no current-surge, on synchronizing. It has a very good starting-torque, with an extremely low current-inrush at starting—very considerably better than the ordinary synchronous motor in this regard—because my commutator-connected field-winding, which offers only a slight inductance, due to leakage, during the non-pulsating flux-conditions of synchronous operation, offers a very considerable inductance during starting, thus pulling down the starting-current inrush, while the very superior starting-torque characteristics of a polyphase commutator motor gives my motor a good starting-torque, even at this reduced current-inrush. My motor has high pull-in and pull-out torques, especially with series excitation. With the series excitation, that is, with the polyphase brushes connected in series-circuit relation to the armature-winding, my motor can be adjusted or designed to give an approximately constant power factor, or approximately constant wattless kva, under varying load-conditions, or it can be adjusted to have any other desired wattless characteristic.

In its more general aspects, my invention is not limited to motors, being applicable also to generators; and it is applicable to single-phase machines as well as polyphase machines, and to shunt-connected brush-excitation, as well as serially-connected brush-excitation.

Figure 2:
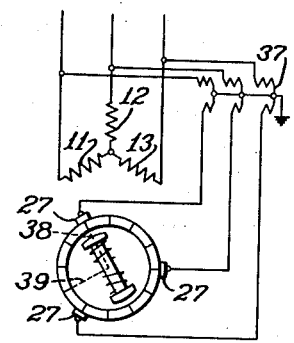
Figure 3:
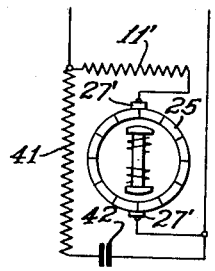
Figure 4:
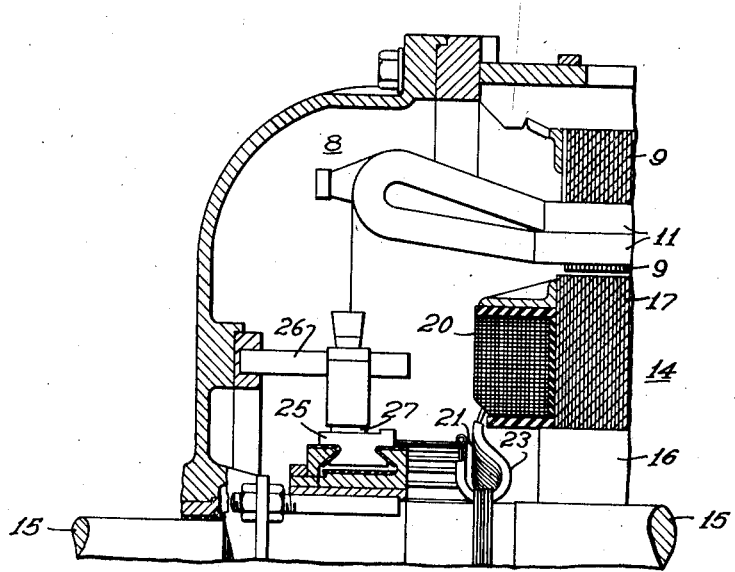

With the foregoing and other objects in view, my invention consists in the machines, parts, combinations, circuits, methods, and systems hereinafter described and claimed, and illustrated in the accompanying drawing, wherein Figure 1 is a diagrammatic view of circuits and apparatus illustrating my invention as embodied in a serially-excited three-phase motor, Fig. 2 is a somewhat simplified diagrammatic view illustrating the application of my invention to a shunt-excited self-excited motor, Fig. 3 is a similar simplified diagrammatic view of a single-phase motor embodying my invention; and Fig. 4 is a longitudinal sectional view illustrating the physical construction of a motor of the type shown in Fig. 1.

In Figs. 1 and 4, I have illustrated my invention as comprising a three-phase armature-member which is also the stator-member 8, having a laminated stator-core 9, and a three-phase armature-winding 11, 12, 13 carried by said armature-core 9. Cooperating with the armature or stator-member 8, in dynamo-electric relation thereto, is a field-member, which is also the rotor-member 14, having a shaft 15, a core-spider 16, and a plurality of preferably laminated salient pole-pieces 17 carried by the spider 16, as by being dovetailed thereto, as indicated at 18 in Fig. 1. It will be understood that there will be an even number of salient poles 17, to provide alternatingly north and south poles, as is usual in synchronous-motor construction. The field-core carries a field-winding 20, arranged in a plurality of polar coils wound on the respective salient pole-pieces 17 in a manner similar to an ordinary synchronous motor, except that, in accordance with my invention, each pole of the field-winding 20 is provided with a plurality of intermediate electrical tap-connections 21, which divide each pole-piece winding into a plurality of serially connected coils or part-winding sections 22 between these tap-connections 21.

The poles of the field winding 20, in the particular machine which I have chosen for illustration, are connected in series, in a continuous circuit as indicated by the intermediate serial connections 23 and 24 (Fig. 1), in such polarity that one pole of each pair of poles has one polarity, while the other pole has the other polarity, so that the machine has alternately north and south poles, during synchronous operation, as in ordinary synchronous machines.

It will be noted that the coils 22, or part-winding sections, for any one pole of the field-winding 20, are all wound around the shank of the same pole-piece 17, so that these coils or part-winding sections 22 are concentric, that is, they all have substantially a common center-line, as distinguished from the so-called distributed-winding arrangement in which successive coils are displaced slightly in space, by an amount equal to 180 electrical degrees divided by the number of coils per pole.

The effect of the concentricity of all of the coils of any one polar-winding is that all of these coils, or part-winding sections, produce magnetic flux along approximately the same magnetic axis or center-line of the pole 17, the word "approximately" being utilized because, under the influence of armature-reaction, the flux is distorted or shifted somewhat from the exact center-line of the pole, while still being confined well within the limits of the pole-piece, as is well understood in the art. A further effect of the coaxial arrangement of the coils or part-winding sections of any pole is to cause these coils to have a rather high mutual inductance with respect to each other, because their magnetic fluxes all traverse the same magnetic path, in this case the shank of the pole-piece 17.

The foregoing represents the essential feature of my field-winding 20, namely that the serially connected part-winding sections 22 of each pole of the field-winding shall be substantially concentric, or shall be what is known as a concentrated type of winding, rather than a distributed winding, and I desire my illustration of the preferred form of construction, in the salient-pole motor of Fig. 1, to be construed as representative of any concentric-coil field-winding, whether mounted on a salient-pole field-core, or a smooth field-core.

The rotor-member or field-member 14 is also provided with a multi-segment commutator-member 25, the successive segments of which are connected to the successive electrical connections 21, 23, and 24 of the serially connected coils 22 of the field-winding 20. The stator-member 8 carries brush-rigging 26 for supporting a set of three-phase brushes 27 which are disposed in contact-making engagement with the commutator-member 25, with phase-displacements of 120 electrical degrees therebetween. The field-winding 20 is connected to the commutator-member 25 so that each pole of the field-winding is connected across 180 electrical degrees of the commutator-member, with the successive serially connected coils or part-winding sections 22 connected between successive segments of the commutator-member.

The result of the commutated field-winding arrangement just described is that, when the motor is operating at a speed in synchronism with three-phase currents which are supplied to the three brushes 27, the flux traversing the field-core 16—17 remains unidirectional, and substantially non-pulsatory. In other words, one pole becomes a north pole, the next one a south pole, and so on around the machine, for as many poles as there are; and the magnitude of the fluxes in these poles remains constant, so long as the alternating-current input into the brushes is constant. This is approximately true, even if the number of turns in each of the coils or part-winding sections 22 of the field-winding 20 is the same for all of the coils, but this condition is more nearly approached if the number of turns of the coils or part-winding sections 22 is reduced, or tapered off, for the coils which are closest to the pole-terminals 23 and 24 of the field-winding, that is, the points where successive poles of the field-winding are connected together. It will be noted that, to obtain this effect of a constant or non-pulsatory unidirectional exciting-flux, the total number of coils or part-winding sections 22 of any pole-piece 17 are not, at any time, all energized from the same phase of the three-phase supply; and they are not always all magnetized in the same direction; a few of the coils generally having current passed through them in a direction bucking the magnetization of the majority of the coils. The relative magnitudes of the three-phase currents, and the time-phase relations between them, are such that the total effect is a constant unidirectional flux for any given magnitude of alternating current, particularly if the numbers of turns of the coils are tapered down in the vicinity of the pole-terminals 23 and 24 so that an approximately sinusoidal variation in the total or resultant flux or ampere-turns would be obtained if direct current were passed between any two of the three brushes 27, while the commutator is rotating.

The magnitude of the unidirectional total or resultant magnetomotive force or ampere-turns in each of the salient poles 17 depends upon the phase-position of the brushes 27 with respect to the phase of the alternating current which is fed into the brushes and thence to the field-winding 20. Thus, the field-excitation is a maximum when the brush of the phase which is carrying the maximum current, at the instant of current-maximum in that phase, is resting upon the commutator-segment which is connected to the pole-terminal, say 23, at that moment; and any departure from that position will result in a diminution in the magnitude of the total or resultant field-flux, approximately in accordance with the cosine of the electrical angle of the phase-shift of the brushes.

The normal no-load unity-power-factor position of the center-line 30 of the poles is in quadrature relation to the center-line of the rotating stator flux. At the moment of current-maximum of the current in any phase, such as the phase 11, the flux-position of the rotating stator-flux is coincident with the center-line of that phase, and in Fig. 1 the rotor-member has been shown in the relative position which it would have, during synchronous operation, at such a moment, at unity power-factor and no-load. In the normal operation of synchronous motor, the rotor-position at the moment of current-maximum in the principal phase 11 will shift by a so-called load-angle which I can indicate as P, and also in accordance with the power-factor angle, which I can designate as Q, synchronous motors being usually operated overexcited, so as to produce a leading power factor, or so as to feed magnetizing wattless kva into the line.

In Fig. 1, I have shown the brushes 27 set back by an angle S, back of the position which would be in quadrature relation to the center-line of the phase-winding 11, 12 or 13 to which the respective brushes are connected. That is, if the motor is operating in a clockwise direction, as indicated by the arrow 31, the brushes 27 are shown as being set back in a counterclockwise direction, by an angle S with respect to what I call the normal exciting axis 30, which is in quadrature relation to the phase which excites any particular brush 27. The total magnitude of the unidirectional exciting-flux in each pole-piece 17, will, therefore, be proportional to the magnitude of the alternating current I, multiplied by the cosine of the angle $(P+Q-S)$. Now S may be either zero, or plus, or minus, which is to say that each brush 27 may be set on its normal quadrature-related exciting-axis 30, or it may be set back by an angle S, as shown in Fig. 1, or it may be set ahead, in the other direction, by an angle $(-S)$.

The adjustment of the angular phase-position or setting S of the brushes provides an instrumentality whereby the design-engineer or the user may predetermine the wattless characteristics of the motor, or the response of the motor to changing load-conditions. For instance, if the load should double, the load-current would approximately double, or materially increase, so that the resultant or total magnetomotive-force in the field-poles 17 would approximately double, if it were not for the changing relative phase-positions. The doubling of the load approximately doubles the load-angle P, or causes it to increase, at any rate, so that the effective excitation-angle $(P+Q-S)$ is also changed. The relation between the total field-magnetomotive-force and the total field-flux is determined by the magnetizing curve of the machine, and an adjustment of the magnitude and direction of the brush-shift S gives the designer or the operator an opportunity to set the brushes so that the machine ordinarily offsets the tendency of a synchronous motor, which is operating at a leading power factor, to increase its power-factor, or decrease its magnetizing wattless kva, when the load increases; and it thus becomes possible to control the slope of the power-factor curve with respect to changing loads, or the slope of the wattless-kva curve with changing loads, making this curve either approximately flat, or sloping either up or down, as may be required or desired. In other words, a control of the brush-shaft angle S, in my new design of motor, makes it possible to give the motor, within certain limits, a predetermined inherent wattless or power-factor characteristic, with changing motor-loads.

My improved motor, as shown in Fig. 1, is started by the simple expedient of closing a line switch or breaker 33. The motor then starts, very much after the manner of a three-phase commutator-motor except that the rotor of my motor produces only a pulsating flux, in a fixed magnetic axis with respect to the rotor-position, instead of a rotating magnetic flux which can rotate in all positions around the rotor, not being fixed by the rotor-position. My pulsating alternating flux, which is obtained during the starting-conditions, is resolvable into forwardly and backwardly rotating components, each of half of the magnitude of the total pulsating flux. The starting-torque equations are quite complicated, but the principal starting torque is obtained from the coaction between the rotating stator-field and the correspondingly or forwardly rotating component of the rotor-field, and these two fields, reacting together, produce a strong starting torque, for any given field-magnitude. My motor is thus able to develop a larger starting-torque, on a smaller starting-current inrush, than is possible in the ordinary synchronous motor which starts on damper windings after the manner of a squirrel-cage induction-motor. In my motor, no damper windings are utilized at all.

The starting characteristics of my motor are also affected by the brush-positioning S, and by the reactance of the field-winding, particularly at the moment of starting. It is well known that a polyphase commutator motor develops a starting-torque dependent upon the amount by which the brushes are shifted from their position of coincidence with the phase-axis, or the angle $(90°-S)$, measuring S from the quadrature-related position 30, as indicated in Fig. 1. An adjustment of the brush-shift angle S, or a preselection of the brush-shift angle S, constitutes a means which is available to the operator or to the designer, in adapting the motor for desirable starting-characteristics.

The reactance of my commutated field-winding 20 is a valuable starting-asset, particularly to the series-excited motor which has been described in connection with Fig. 1. It has already been pointed out that, at synchronous speed, the flux through the field-core 16—17 does not change with the 60-cycle or line-frequency alternations of the current, but remains fixed and constant, for any given magnitude of current and relative phase-position of the rotor. Under these synchronous-speed conditions, therefore, the steady-state value of the field-flux cooperates with the strong mutual inductance between the field-coils or field-winding sections to make the rotor-induction quite small, in fact only the slight amount of inductance which is due to leakage, so that the rotor-inductance adds only a relatively small amount to the stator-reactance of the motor during synchronous operation. At starting, however, the rotor-flux is not a constant unidirectional flux, but it is pulsating and alternating; and at starting, the frequency of the rotor-flux alternations is a maximum, being equal to the full line-frequency. Under these starting-conditions, therefore, the rotor-flux is not negligible but, on the contrary, it is very high, so that the serially connected rotor-winding 20, which is connected in series with the stator-winding 11—12—13 through the commutator-and-brushes 25—27, adds very considerably to the stator-inductance, and results in a very considerable reduction in the starting-current inrush, making it possible to start the motor, even on the full line-voltage, without an excessive current-inrush, in many instances.

The concentric-coil arrangement of my commutated polyphase-excited field-winding 20 causes my motor, when it reaches synchronous speed, during the starting operation, to automatically and quietly drop into step, without any disturbance on the supply-line and without any attention whatsoever from the operator. If it were not for the characteristic of my motor which gives it a fixed field-flux axis (fixed with respect to the rotor), my motor would not hesitate at the synchronous speed but would pass right through synchronism, as in any other polyphase synchronous machine. My fixed field-excitation axis, coupled with the characteristic of the machine to develop a unidirectional magnetomotive force proportional to the alternating-current magnitude multiplied by the cosine of the angle $(P+Q-S)$ gives my motor a strong pull-in torque and a strong pull-out torque, which enables it to operate as a synchronous motor, while at the same time giving the motor very superior inherent power-factor regulation in regard to the wattless-kva characteristic.

While I have thus far described my motor, in detail, with respect to a series-excited three-phase embodiment, as shown in Fig. 1, my invention is not limited to this particular embodiment, and my machine may be utilized as a generator, as well as a motor.

In Fig. 2, I have illustrated a synchronous machine in which the rotor-member is not excited in series-circuit relation to the stator-member, but in shunt-circuit relation thereto. As in all commutator motors, it is desirable to limit the magnitudes of the voltages appearing in the coils undergoing commutation. It is usually desirable to design the field-winding which is connected to the commutator for a lower voltage than the full line-voltage, and I have accordingly indicated this feature in Fig. 2 by showing a step-down three-phase transformer 37 for energizing the brushes 27 from the three-phase supply-line. In Fig. 2, I have also illustrated the brush-position, as indicated by the line 38, in quadrature relation to the axis 39 of the stator-winding which is connected to the same line-phase as the brush; in other words, I have illustrated the brush-displacement angle S as being zero. In other respects, the motor illustrated in Fig. 2 is, or may be, similar to that which is shown in Fig. 1.

In Fig. 3, I have illustrated my invention as being applied to a single phase motor, having a serially connected, single-phase excited, commutated rotor or field-member. In this form of my invention, I utilize only two brushes 27', which are connected in series with the main stator-winding 11', across a single-phase supply-line. Such a single-phase motor will preferably have some sort of split phase or other means for producing a rotating stator-torque, as by means of an auxiliary stator-winding 41 in space-quadrature relation to the main stator-winding 11'; the auxiliary stator-winding 41 having dephased currents therein, such as might be produced by a serially connected capacitor 42; the auxiliary winding 41, with its capacitor 42, being energized across the single-phase supply-line.

While I have illustrated my invention in several different forms of embodiment, and while I have explained the principles thereof in accordance with my best present understanding of the same, I wish it to be understood that I am not limited, either to the precise forms of embodiment of my invention, or as to every detail of the principles and theories which have been referred to in attempting to explain its operation and advantages. I consider that my basic invention consists in the broad idea of utilizing a commutated field-winding, with line-frequency excitation, or excitation by any alternating currents which are synchronized with the line frequency, and with a plurality of concentric field-coils or field-winding sections for each pole of the field-winding. I desire, therefore, that the broadest of the appended claims shall be broadly construed as being directed to this basic invention, without limitation to structural details or theories of design or operation.

I claim as my invention:

1. A synchronous dynamo-electric machine comprising an armature member and a field member, one rotatable relatively to the other in dynamo-electric relation, said armature member having a $p$-pole armature-winding, said field member having a $p$-pole field-winding, where $p$ is an even number; each pole of the field-winding comprising a plurality of concentric mutually inductive part-winding sections all having a substantially common center-line; the part-winding sections of each pair of poles being serially related in such polarity that one pole has one polarity and the other pole has the opposite polarity; a multi-segment commutator-member carried by the field member, commutator-connections for connecting successive serially-connected part-winding sections of the field-winding between successive segments of the commutator-member; a plurality of brushes carried by the armature member in contact-making engagement with the commutator-member, and means for energizing said brushes with alternating current in synchronized relation to the armature-winding current.

2. A synchronous dynamo-electric machine comprising an armature member and a field member, one rotatable relatively to the other in dynamo-electric relation, said armature member having a $p$-pole armature-winding, said field member having a $p$-pole field-winding, where $p$ is an even number, each pole of the field-winding comprising a plurality of concentric mutually inductive part-winding sections all having a substantially common center-line, the part-winding sections of each pair of poles being serially related in such polarity that one pole has one polarity and the other pole has the opposite polarity; a multi-segment commutator-member carried by the field member, commutator-connections for connecting successive serially-connected part-winding sections of the field-winding between successive segments of the commutator-member, a plurality of brushes carried by the armature member in contact-making engagement with the commutator-member, and means for energizing said brushes with alternating current in series-circuit relation to the armature winding.

3. A synchronous dynamo-electric machine comprising an armature member and a field member, one rotatable relatively to the other in dynamo-electric relation, said armature member having a $p$-pole armature-winding, said field member having a $p$-pole field-winding, where $p$ is an even number, each pole of the field-winding comprising a plurality of concentric mutually inductive part-winding sections all having a substantially common center-line, the part-winding sections of each pair of poles being serially related in such polarity that one pole has one polarity and the other pole has the opposite polarity, a multi-segment commutator-member carried by the field member, commutator-connections for connecting successive serially-connected part-winding sections of the field-winding between successive segments of the commutator-member, a plurality of brushes carried by the armature member in contact-making engagement with the commutator-member, and means for energizing said brushes with alternating current in shunt-circuit relation to the armature-winding.

4. A synchronous dynamo-electric machine comprising an armature member and a field member, one rotatable relatively to the other in dynamo-electric relation, said armature member having a $p$-pole $n$-phase polyphase armature-winding, said field member having a $p$-pole field-winding, where $p$ is an even number, each pole of the field-winding comprising a plurality of concentric, mutually inductive part-winding sections all having a substantially common center-line, the part-winding sections of each pair of poles being serially related in such polarity that one pole has one polarity and the other pole has the opposite polarity, a multi-segment commutator-member carried by the field member, commutator-connections for connecting successive serially connected part-winding sections of the field-winding between successive segments of the commutator-member, $n$-phase-related brushes carried by the armature member in contact-making engagement with the commutator-member, and means for energizing said brushes with polyphase current in synchronized relation to the armature-winding current.

5. A synchronous dynamo-electric machine comprising an armature member and a field member, one rotatable relatively to the other in dynamo-electric relation, said armature member having a $p$-pole $n$-phase polyphase armature-winding, said field member having a $p$-pole field-winding, where $p$ is an even number, each pole of the field-winding comprising a plurality of concentric, mutually inductive part-winding sections all having a substantially common center-line, the part-winding sections of each pair of poles being serially related in such polarity that one pole has one polarity and the other pole has the opposite polarity, a multi-segment commutator-member carried by the field member, commutator-connections for connecting successive serially connected part-winding sections of the field-winding between successive segments of the commutator-member, $n$-phase-related brushes carried by the armature member in contact-making engagement with the commutator-member, and means for energizing said brushes with polyphase current in series-circuit relation to the armature-winding.

6. A synchronous dynamo-electric machine comprising an armature member and a field member, one rotatable relatively to the other in dynamo-electric relation, said armature member having a $p$-pole $n$-phase polyphase armature-winding, said field member having a $p$-pole field-winding, where $p$ is an even number, each pole of the field-winding comprising a plurality of concentric, mutually inductive part-winding sections all having a substantially common center-line, the part-winding sections of each pair of poles being serially related in such polarity that one pole has one polarity and the other pole has the opposite polarity, a multi-segment commutator-member carried by the field member, commutator-connections for connecting successive serially connected part-winding sections of the field-winding between successive segments of the commutator-member, $n$-phase-related brushes carried by the armature member in contact-making engagement with the commutator-member, and means for energizing said brushes with polyphase current in shunt-circuit relation to the armature-winding.

7. A self-excited synchronous machine comprising a stator-member having an $n$-phase polyphase armature-winding, a rotor-member having a field-winding producing alternate north and south poles, each pole of the field-winding comprising a plurality of concentric part-winding sections all having a substantially common center-line, the part-winding sections of each pair of poles being serially related, said rotor-member also including a multi-segment commutator-member having $n$-phase-related brushes bearing thereon, commutator-connections for connecting each pole of the field-winding across 180 electrical degrees of the commutator-member, with successive serially connected part-winding sections of the field-winding connected between successive segments of the commutator-member, and means including brush-connections for energizing the brushes in a predetermined manner from the polyphase armature winding.

8. A self-excited synchronous machine comprising a stator-member having a polyphase armature-winding having two sets of three-phase terminals, a rotor-member having a field-winding producing alternate north and south poles, each pole of the field-winding comprising a plurality of concentric part-winding sections all having a substantially common center-line, the part-winding sections of each pair of poles being serially related, said rotor-member also including a multi-segment commutator-member having brushes bearing thereon with phase-displacements of 120 electrical degrees therebetween, commutator-connections for connecting each pole of the field-winding across 180 electrical degrees of the commutator-member, with successive serially connected part-winding sections of the field-winding connected between successive segments of the commutator-member, and armature-connections for connecting one set of the armature-winding terminals to said brushes.

9. A self-excited synchronous machine comprising a stator-member having an armature-winding of a type adapted to produce a rotating flux, a salient-pole rotor-member having field-windings on the salient pole-pieces, each pole of the field-windings comprising a plurality of serially connected part-winding sections having electrical tap-connections between the sections, said rotor-member also including a multi-segment commutator-member having a plurality of brushes bearing thereon, commutator-connections for connecting each pole of the field-winding across 180 electrical degrees of the commutator-member, which successive serially connected part-winding sections of the field winding connected between successive segments of the commutator-member, and means including brush-connections for energizing the brushes in a predetermined manner from the armature winding.

10. A self-excited synchronous machine comprising a stator-member having a polyphase armature-winding, a salient-pole rotor-member having field-windings on the salient pole-pieces, each pole of the field-windings comprising a plurality of serially connected part-winding sections having electrical tap-connections between the sections, said rotor-member also including a multi-segment commutator-member having three-phase-related brushes bearing thereon, commutator-connections for connecting each pole of the field-winding across 180 electrical degrees of the commutator-member, with successive serially connected part-winding sections of the field-winding connected between successive segments of the commutator-member, and means including brush-connections for energizing the three-phase-related brushes with three-phase currents obtained in a predetermined manner from the polyphase armature-winding.

11. A self-starting self-excited synchronous machine comprising a stator-member having a laminated armature-core and a polyphase armature-winding carried by said armature-core, a rotor-member having a field-core and a field-winding carried by said field-core, at least the portion of the field-core which carries the field-winding being laminated, said field-winding producing alternate north and south poles during synchronous operation, each pole of the field-winding comprising a plurality of concentric part-winding sections all having a substantially common center-line, the part-winding sections of each pair of poles being serially related, said rotor-member also including a multi-segment commutator-member having polyphase-related brushes bearing thereon, commutator-connections for connecting each pole of the field-winding across 180 electrical degrees of the commutator-member, with successive serially connected part-winding sections of the field-winding connected between successive segments of the commutator-member, and means for energizing said polyphase-related brushes with polyphase current in series-circuit relation to the polyphase armature-winding.

12. The invention as defined in claim 2, characterized by said brushes being displaced from a position in quadrature relation to the armature-winding by an amount such as to give the machine a desired wattless-kva characteristic under predetermined variable load-conditions and over a predetermined range of wattless kva.

13. The invention as defined in claim 5, characterized by said brushes being displaced from a position in quadrature relation to the armature-winding by an amount such as to give the machine a desired wattless-kva characteristic under predetermined variable load-conditions and over a predetermined range of wattless kva.

14. The invention as defined in claim 8, characterized by said brushes being displaced from a position in quadrature relation to the armature-winding by an amount such as to give the machine a desired wattless-kva characteristic under predetermined variable load-conditions and over a predetermined range of wattless kva.

15. The invention as defined in claim 11, characterized by said brushes being displaced from a position in quadrature relation to the armature-winding by an amount such as to give the machine a desired wattless-kva characteristic under predetermined variable load-conditions and over a predetermined range of wattless kva, and to give the machine a desired starting characteristic.

ROBERT C. ROBINSON.